US011866296B2

(12) United States Patent
Siman Tov et al.

(10) Patent No.: US 11,866,296 B2
(45) Date of Patent: Jan. 9, 2024

(54) SYSTEMS AND METHODS FOR MANAGING CABINS WITH AUTOMATIC DOORS

(71) Applicant: VAYYAR IMAGING LTD., Yehud (IL)

(72) Inventors: Tal Haim Siman Tov, Nehser (IL); Uri Adar, Nofit (IL); Jumana Silbak, Haifa (IL); Doron Cohen, Tel Aviv Yafo (IL); Albert Jacob, Modiin (IL); Noga Barpal, Tel Aviv (IL)

( * ) Notice: Subject to any disclaimer, the term of this patent is extended or adjusted under 35 U.S.C. 154(b) by 0 days.

(21) Appl. No.: 18/016,366

(22) PCT Filed: Dec. 14, 2021

(86) PCT No.: PCT/IB2021/061685
§ 371 (c)(1),
(2) Date: Jan. 16, 2023

(87) PCT Pub. No.: WO2022/130194
PCT Pub. Date: Jun. 23, 2022

(65) Prior Publication Data

US 2023/0211978 A1 Jul. 6, 2023

Related U.S. Application Data

(60) Provisional application No. 63/248,497, filed on Sep. 26, 2021, provisional application No. 63/124,933, filed on Dec. 14, 2020.

(51) Int. Cl.
*B66B 1/34* (2006.01)
*B66B 5/00* (2006.01)
*B66B 13/26* (2006.01)

(52) U.S. Cl.
CPC .......... *B66B 1/3476* (2013.01); *B66B 5/0012* (2013.01); *B66B 13/26* (2013.01)

(58) Field of Classification Search
CPC ... B66B 1/3415; B66B 1/3446; B66B 1/3476; B66B 5/00-0018; B66B 5/0031; B66B 5/021; B66B 5/025; B66B 2201/4684
See application file for complete search history.

(56) References Cited

U.S. PATENT DOCUMENTS 4,894,952 A * 1/1990 Trett ........................ H04B 3/54 49/27
7,575,101 B2 * 8/2009 Copsey .................. B66B 13/26 187/316

(Continued)

FOREIGN PATENT DOCUMENTS

WO 2008013515 A2 1/2008
WO 2021124098 A1 6/2021

*Primary Examiner* — Christopher Uhlir
(74) *Attorney, Agent, or Firm* — AlphaPatent Associates Ltd.; Daniel J. Swirsky

(57) ABSTRACT

An elevator monitoring system and method includes cabin-based radars monitor doors and passengers within a cabin; waiting zone radars monitor passengers in a waiting zone; a central processor analyzes data from the various monitors and executes an elevator control function to control the elevator system. The door state is determined by detecting reflections from internal angles within the cabin and a door management system manages door operation safely by monitoring a proximal zone around the automatic door, detecting moving objects and obstructions.

20 Claims, 12 Drawing Sheets

(56) References Cited

U.S. PATENT DOCUMENTS

| | | | | |
|---|---|---|---|---|
| 2004/0108171 | A1 | 6/2004 | De Coi | |
| 2005/0140319 | A1 | 6/2005 | Takashima | |
| 2006/0037818 | A1 | 2/2006 | Deplazes et al. | |
| 2011/0073416 | A1 | 3/2011 | Nowel | |
| 2020/0048045 | A1 | 2/2020 | Xiong et al. | |
| 2020/0071133 | A1* | 3/2020 | Kelly | G01V 8/10 |
| 2020/0102186 | A1* | 4/2020 | Pahlke | B66B 1/28 |
| 2020/0331723 | A1* | 10/2020 | Sudi | B66B 1/2408 |

* cited by examiner

SYSTEMS AND METHODS FOR MANAGING CABINS WITH AUTOMATIC DOORS

CROSS-REFERENCE TO RELATED APPLICATIONS

This application is a U.S. National Phase Application under 35 U.S.C. 371 of International Application No. PCT/IB2021/061685, which has an international filing date of Dec. 14, 2021, which claims the benefit of priority from U.S. Provisional Patent Application No. 63/124,933, filed Dec. 14, 2020, and U.S. Provisional Patent Application No. 63/248,497, filed Sep. 26, 2021, the contents of which are incorporated by reference in their entirety.

FIELD OF THE INVENTION

The disclosure herein relates to systems and methods for monitoring cabins with automatic doors. In particular the disclosure relates to using RF signals generated by a multi antenna transceiver to measure if a door is open or closed. More particularly, the invention is well suited for automatic moving doors, windows, barriers and the like, for example in controlling an elevator system based upon data generated by radar enabled monitors.

Doors are inherently dangerous devices. They consist of a movable barriers which are often large and heavy enough to cause injury to those in their path. Where automatic doors are required such as in an elevator, a train carriage, an entryway, or the like, it is necessary to incorporate various sensors to prevent accidents occurring.

Sensors used to protect those in the path of automatic doors include, optical sensors, pressure sensors, infra-red sensors and the like however these are typically used to prevent only the opening and the closing of the door. Such sensors do not provide monitoring of the movement of objects in the region surrounding the automatic door. Furthermore, existing systems often fail to detect stationary objects which are introduced into the monitored area.

It is also difficult to identify humans from other objects in the vicinity. Thus, for example, a passing animal or a rippling puddle of water may trigger an automatic door to open wasting energy both in the doors mechanics as well as in heat passing through the open passageway.

Even where targets are accurately identified as human, the exact velocity of their movement is hard to gauge resulting in poor timing of the door often requiring a door to be opened twice or for too long, further wasting energy.

Elevator systems are an example of an automatic door controlled environment which includes a number of stops and a moving cabin which transits between those stops. The capacity of elevator cabins is limited both by weight and density of passengers however although it is relatively easy for elevators to measure the weight of the load they carry, it remains difficult for elevators to monitor the actual density of passengers within the cabin.

Similarly, it is useful for elevator systems to manage the stopping schedule of the travelling cabin which typically requires a knowledge of the number of passengers waiting at each stop. Although waiting passengers are encouraged to use a manual button to notify the elevator system to their presence, there is no direct method of monitoring the number of passengers waiting by each stop.

SUMMARY

The need remains, therefore, for a method of monitoring the movement of automatic doors as well as objects surrounding those doors for example monitoring the density of passengers using elevator systems. The invention described herein addresses the above-described needs.

According to one aspect of the invention an elevator monitoring method is presented for monitoring passengers using an elevator system. The method includes providing at least one cabin-based radar monitor configured and operable to monitor passengers within at least one elevator cabin; providing at least one waiting zone radar monitor configured and operable to monitor passengers in a waiting zone; and providing a central processor configured and operable to receive data from the at least one cabin-based radar monitor and the at least one waiting zone radar monitor, to analyze the data received from the at least one cabin-based radar monitor and the at least one waiting zone radar monitor and to execute an elevator control function to control the elevator system.

Variously, the step of executing the elevator control function comprises preventing movement of the elevator cabin if the received data indicates that cabin passenger density is above a threshold value. Additionally or alternatively, executing the elevator control function comprises preventing the elevator doors from closing if the received data indicates that cabin passenger density is above a threshold value. Additionally or alternatively, again, executing the elevator control function comprises preventing the elevator doors closing if the received data indicates that a passenger is approaching the cabin.

Where appropriate, the monitoring system may further comprise providing a security scanner configured to generate security passes for passengers, and wherein executing the elevator control function comprises preventing the elevator doors from closing if the received data indicates that the number of passengers within the elevator cabin is more than the security passes provided. Optionally, the monitoring system may further comprise providing a health monitor configured and operable to measure at least one health parameter of each passenger within the elevator cabin and the waiting zone. For example, at least one health parameter may be selected from heart rate, heart variability, respiratory rate, gait sleep scores, posture, temperature, weight and blood pressure of the passenger and the like.

Optionally, providing the health monitor further comprising providing at least one array of radio frequency transmitter antennas and at least one array of radio frequency receiver antennas, wherein the array of radio frequency transmitter antennas are connected to an oscillator and are configured and operable to transmit electromagnetic waves within the elevator cabin and the waiting zone, and wherein the radio frequency receiver antennas are configured to receive the electromagnetic waves reflected back from objects within the elevator cabin and the waiting zone.

Other aspects of the invention teach a method for managing an automatic door by detecting current door state of a door to a reflective cabin by providing at least one cabin-based radar monitor comprising a transmitter, a receiver and a processor; transmitting electromagnetic waves into the cabin; and receiving electromagnetic waves reflected back from the sides of the cabin; and processing received signals to remove multiply reflected waves. Accordingly, if received signals do not include specular reflections from corners formed between the door and doorframe then selecting an OPEN state; if received signals include specular reflections directly from the door then selecting a CLOSED state; and if received signals include specular reflections from corners formed between the door and doorframe then selecting a NOT OPEN state.

Optionally the method for managing an automatic door may include providing at least one proximal zone radar monitor configured and operable to monitor a target region around an automatic door; providing at least one danger zone radar monitor configured and operable to monitor a danger region where items may obstruct the door; capturing a reference background of the danger region; and providing a door management processor configured and operable to select a door state.

The door management processor may receive raw data from the proximal zone radar monitor; the door management processor may remove a background from the raw data from the proximal zone thereby calculating a proximal zone differential; and may compare the proximal zone differential to a first threshold value. Accordingly, if the proximal differential exceeds the first threshold value then a moving object is identified which is monitored over over multiple frames the direction of motion associated with the moving object is determined. If the direction of motion moving towards then, if the door state is CLOSED, then a operation request is sent to the danger zone radar monitor.

The danger zone radar monitor may subtract a reference background from the raw data from the danger zone; calculate a danger zone differential; and compare the danger zone differential to a second threshold value. Accordingly, if the danger zone differential exceeds the second threshold value then an obstruction is identified; if the danger zone differential does not exceed the threshold value then the door may be operated; and the door state may be set to OPEN.

Optionally, the danger zone radar monitor may capture more than one reference background comprises, for example by capturing an OPEN-reference background when the automatic door is in an OPEN state, and capturing a CLOSED-reference background when the automatic door is in a CLOSED state. Accordingly, if the current door state is OPEN then subtracting the OPEN-reference background from the raw data; and if the current door state is CLOSED then subtracting the CLOSED-reference background from the raw data.

In order to detect the current door state, the danger zone radar monitor may transmit electromagnetic waves towards the automatic doors; receive electromagnetic waves reflected back the automatic doors; detect reflections from corners of the automatic door; and determine position of the corners of the automatic doors. Thus, if the position of the corners is indicative of an open door then the OPEN state is selected and if the position of the corners is indicative of an open door then the CLOSED state is selected.

In another aspect of the invention an elevator monitoring system is introduced for monitoring passengers using an elevator system, the elevator monitoring system. The system includes at least one cabin-based radar monitor configured and operable to monitor passengers within at least one elevator cabin; at least one waiting zone radar monitor configured and operable to monitor passengers in a waiting zone; at least one proximal zone radar monitor configured and operable to monitor a target region around an automatic door; at least one danger zone radar monitor configured and operable to monitor a danger region where items may obstruct the door; a central processor configured and operable to receive data from the at least one cabin-based radar monitor and the at least one waiting zone radar monitor, to analyze the data received from the at least one cabin-based radar monitor and the at least one waiting zone radar monitor and to execute an elevator control function to control the elevator system; and a door management processor configured and operable to receive data from the at least one proximal zone radar monitor and the at least one danger zone radar monitor and further operable to calculate a proximal zone differential and a danger zone differential.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DETAILED DESCRIPTION OF THE EMBODIMENT

Figure 1:
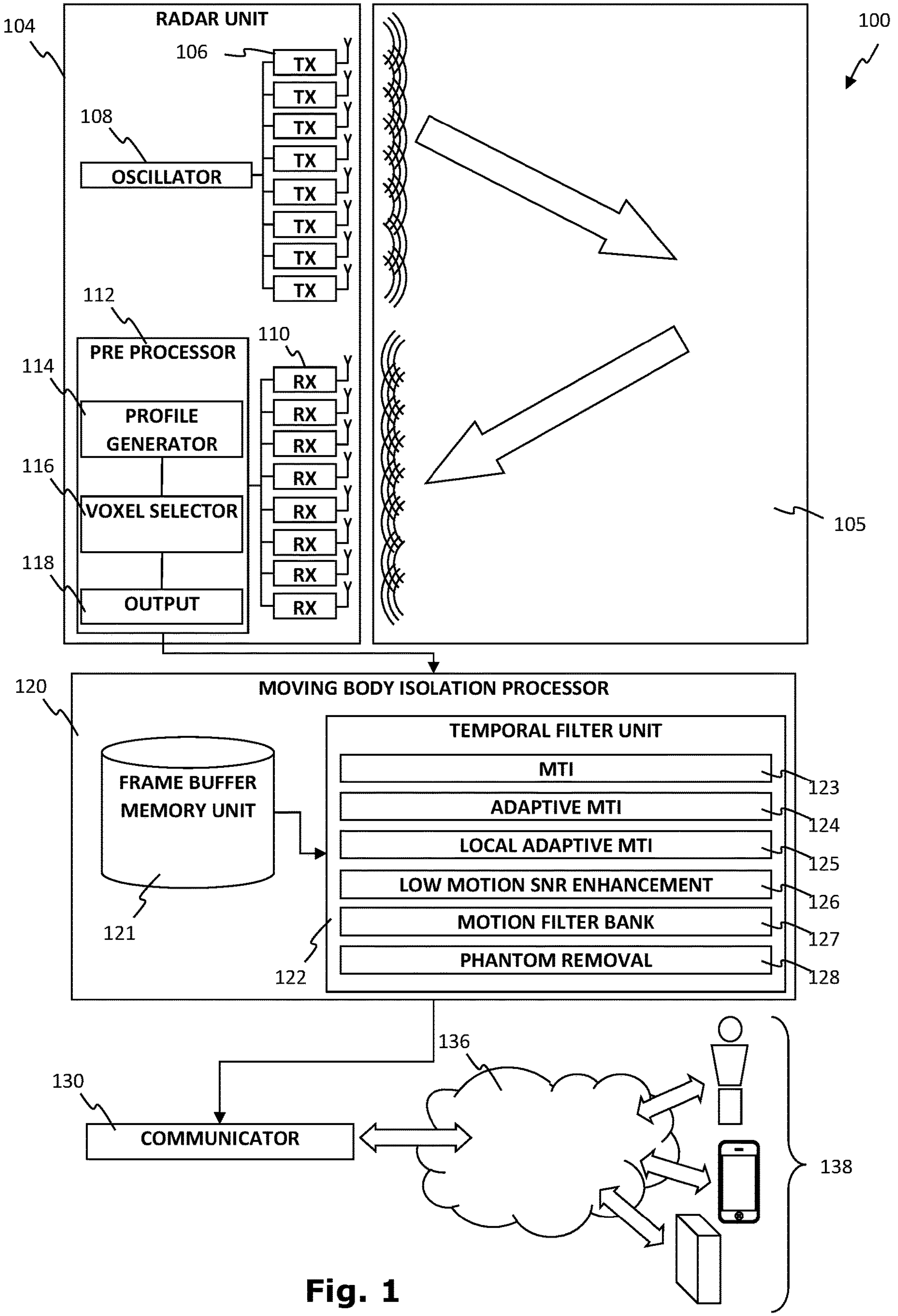
FIG. 1 is a block diagram schematically representing a possible system for radar based monitoring of elevators and automatic doors.

Aspects of the disclosure relate to a method of using RF signals generated by a multi antenna transceiver to measure if a door is open or closed. In particular, radars have been found surprisingly well suited for automatic moving doors, windows, barriers and the like.

Automatic doors are widely used in places like elevators, shopping malls, offices, etc. The status of the door, whether it is open or close or partially open is usually sensed by an internal sensor that is part of the door assembly. For reasons of safety, maintenance and service is it sometimes required to have an independent sensor that will assess the door status.

This sensor should provide high reliability at a low cost. In many applications a video sensor cannot be used due to privacy issues.

Low cost multi antennas RF radars, can provide 3D imaging of a nearby area. They do so by sending RF signals from an array of antennas and receiving them by an array of antennas. Either the same antennas can be used for both transmission and receiving or different antennas.

The signals of a radar working in a dense environment, such as an office or an elevator, contain a lot of clutter due to reflection and multiple reflections from all the fixed reflectors in the environment, such as furniture, walls, handles, etc. Temporal filters and techniques, such as MTI (Moving Target Indication) or Doppler, are frequently used to remove constant signals that are associated with the fixed part of the arena. This leaves in the signal only the part that can be associated to moving targets such as humans.

In various embodiments, at least one remote health monitor includes a radar system configured and operable to scan the subjects remotely in an anonymous manner and to analyze electromagnetic radiation reflected from the subjects so as to obtain required health parameters.

In order to detect doors, as this invention aims to, these techniques cannot be used because the door is not moving. It is desired to detect the status of the door, open or close.

Radar signals reflection from surfaces can be divided into two types: Specular (mirror-like) and Diffuse reflection. Specular reflection of RF signals occurs from metal surfaces, especially flat and from non-metal flat surfaces, such as glass. In this reflection the radio wave coming from the antennae is reflected at a definite angle (like a light beam is reflected from a mirror). Diffuse reflection of RF signals occurs from rough surfaces. The amount of reflection depends on RF wavelength and on the material. In this reflection the radio wave coming from the antennae is reflected at all directions.

In RF 3D imaging object that have diffuse reflections are much favorable as the waves transmitted from the radar are reflected in all directions and some of it is reflected back to the RADAR which can measure it. On the contrary object that have specular reflection are very hard to be detected. They can only be detected only if they are perpendicular to the RADAR.

As a result, when a door is made of metal as the case is in elevators, it cannot be detected by the radar since the specular reflection from it is not reflected back into the radar, except in very unique orientations of the radar and the door.

It has been found that corners formed from three mutually orthogonal planar surfaces have the property that radio frequency waves reflect back in exactly the direction from which the waves were incident upon them, regardless of the hitting wave direction. As a result, the energy reflected from corner is strong relatively to the clutter, and they are more easily detected than other objects.

If the radar is situated in a room where all the walls are highly reflected, such as an elevator or a cooling rom the RF waves will be reflected from the wall numerous times ant fading. In the case a door is this behavior will be much reduced since the chain of reflection will stop as the door do not reflect when it is open.

The present invention comprises of a phased-array-radar (e.g., MIMO radar) that is used to detect the status (open or closed) of doors, windows, slides and alike. The door status is determined by the existence/nonexistence of strong reflections from the corners between the moving element (e.g., door) and its frame. The position of such corners may be determined automatically by detecting flickering when the moving element opens and closes. Reflections from fix corners, such as room corner, may be disregarded as they do not have this flickering nature.

Other aspects of the present disclosure relate to systems and methods for monitoring and controlling an elevator system. In particular the disclosure relates to using radar based monitors to monitor the cabins and waiting zones of an elevator system. The monitors generate data relating to the density and the movement of passengers. A central controller uses the generated passenger data to control the elevator system.

In various embodiments, at least one elevator system monitor includes a radar system configured and operable to scan the subjects remotely in an anonymous manner and to analyze electromagnetic radiation reflected from the subjects so as to obtain required parameters. The system may include a remote health monitor in communication with a processor operable to compute a health status for each subject. Where applicable, a boundary-state may be displayed indicating whether a particular subject has permission to pass a boundary.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined.

In addition, aspects and components described with respect to certain embodiments may be combined in various other embodiments.

Reference is now made to FIG. 1 which is a schematic representation of a possible radar based automatic door monitoring system 100. The system 100 includes a radar unit 104, a processor unit 120 and a communication module 130.

Such as system may be able to monitor with higher accuracy whether there is a person in front of the safety zone close to an automatic door, and if there is someone walking towards the door.

Accordingly, automatic doors will be better able to open or close based on human traffic, with lower false alarm rates. This will improve the energy consumption/efficiency of the building, as there will be less "wasted" door opening It becomes possible to differentiate between humans and inanimate objects like leaves, snow, water, that would otherwise "confuse" the existing systems. Accordingly, velocity may be detected so that the door is timed to open when someone walking towards the door arrive as the door. The door safety can be accomplished with the same sensor as used for people tracking above, which allows our sensor to be used for the regulation of door safety.

The radar unit 104 includes an array of transmitters 106 and receivers 110. The transmitter may include an oscillator 108 connected to at least one transmitter antenna TX or an array of transmitter antennas. 106 Accordingly the transmitter may be configured to produce a beam of electromagnetic radiation, such as microwave radiation or the like, directed towards a monitored region 105 such as an enclosed room or the like. The receiver may include at least one receiving antenna RX or an array of receiver antennas 110 configured and operable to receive electromagnetic waves reflected by objects 102 within the monitored region 105.

The processor unit 120, may include various modules such as a frame buffer memory unit 121 and a temporal filter unit 122. The temporal filter unit may itself include various data filtering modules through which received may be passed to produce a filtered output. Examples of data filtering modules include moving target (MTI) indication modules 123, adaptive MTI modules 124, local adaptive MTI modules 125, low motion signal-to-noise ratio enhancement modules 126, motion filter banks 127 and phantom removal modules 128. Other filter modules may occur to those skilled in the art.

The communication module 130 is configured and operable to communicate the output images to third parties 138. Optionally the communication module 130 may be in communication with a computer network 136 such as the internet via which it may communicate alerts to third parties 138 for example via telephones, computers, wearable devices or the like.

Various temporal filters may be used to distinguished objects of interest from background objects as they may be used to highlight reflections from moving objects over reflections from stationary or slowly moving objects such as walls, furniture and the like. It is further noted that temporal filters may also be used to highlight other slowly changing phenomena such as leakage for example. Such temporal filters may include MTI, adaptive MTI, Local adaptive MTI, Low motion SNR enhancement, Motion filter and phantom removal units.

Figure 2A:
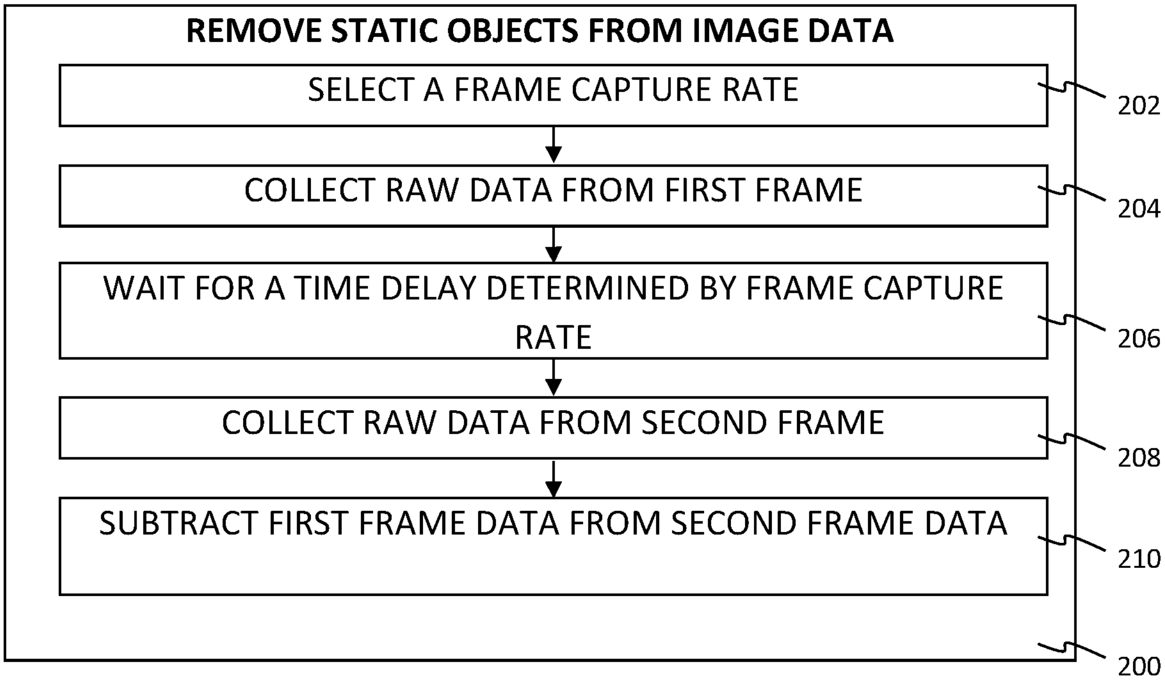
FIGS. 2A and 2B are flowcharts representing methods for detecting moving targets in radar images.

With reference to the flowchart of FIG. 2A, which represents possible actions for removing static objects from image data 200, a temporal filter may be applied to select a frame capture rate 202, to collect raw data from a first frame 204; to wait for a time delay 206, perhaps determined by frame capture rate; to collect raw data from a second frame 208; and to subtract first frame data from the second frame data 210. In this way a filtered image may be produced from which static background is removed and the only moving target data remain.

Figure 2B:
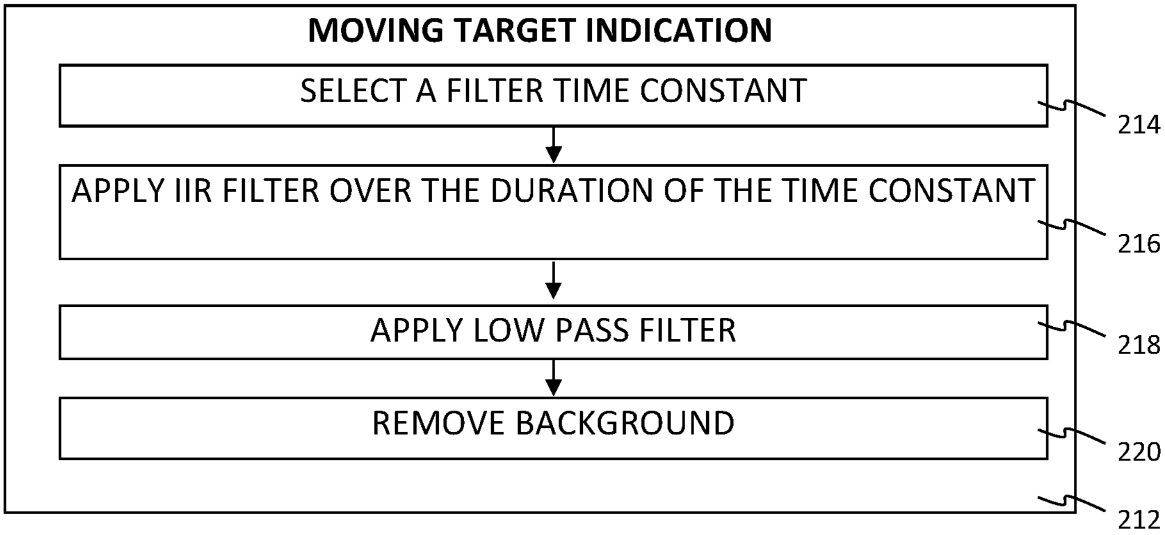

By storing multiple frames within the frame buffer memory unit, the temporal filter may be further improved by applying a Moving Target Indication (MTI) filter 212 as illustrated in FIG. 2B.

An MTI may be applied to data signals before they are transferred to the combiner or directly upon the image data. MTI may estimate background data for example using infinite impulse response (IIR) and low-pass filters (LPF). This background data is subtracted from the image data to isolate reflections from moving objects. It is noted that such a process may be achieved by subtracting the mean value of several previous frames from the current frame.

The MTI IIR filter time constant, or the duration over which the average is taken by the IIR response is generally fixed to best suit requirements, either short to better fit dynamic targets or long to fit still or slow targets.

Accordingly, the MTI method may include steps such as selecting a filter time constant 214, applying an IIR filter over the duration of the selected time constant 216, applying a low pass filter 218, and removing the background from the raw data 220.

It has been found that MTI may generate artifacts such as phantoms when objects are suddenly removed from the background. For example, when a chair is moved, a person moves in their sleep, a wall is briefly occluded, of the like, subsequent background subtraction may cause such events to leave shadows in the image at the previously occupied location. absolute difference values are calculated for the complex signal subtraction, it is not possible to distinguish between a real object and its negative shadow.

Similarly, obscured stationary objects in the background may appear to be dynamic when they suddenly appear when uncovered by a moving object in the foreground.

Furthermore slow changes may be repressed, for example the reflections from people sitting or lying still may change little over time and thus their effects may be attenuated by background subtraction.

Figure 3A:
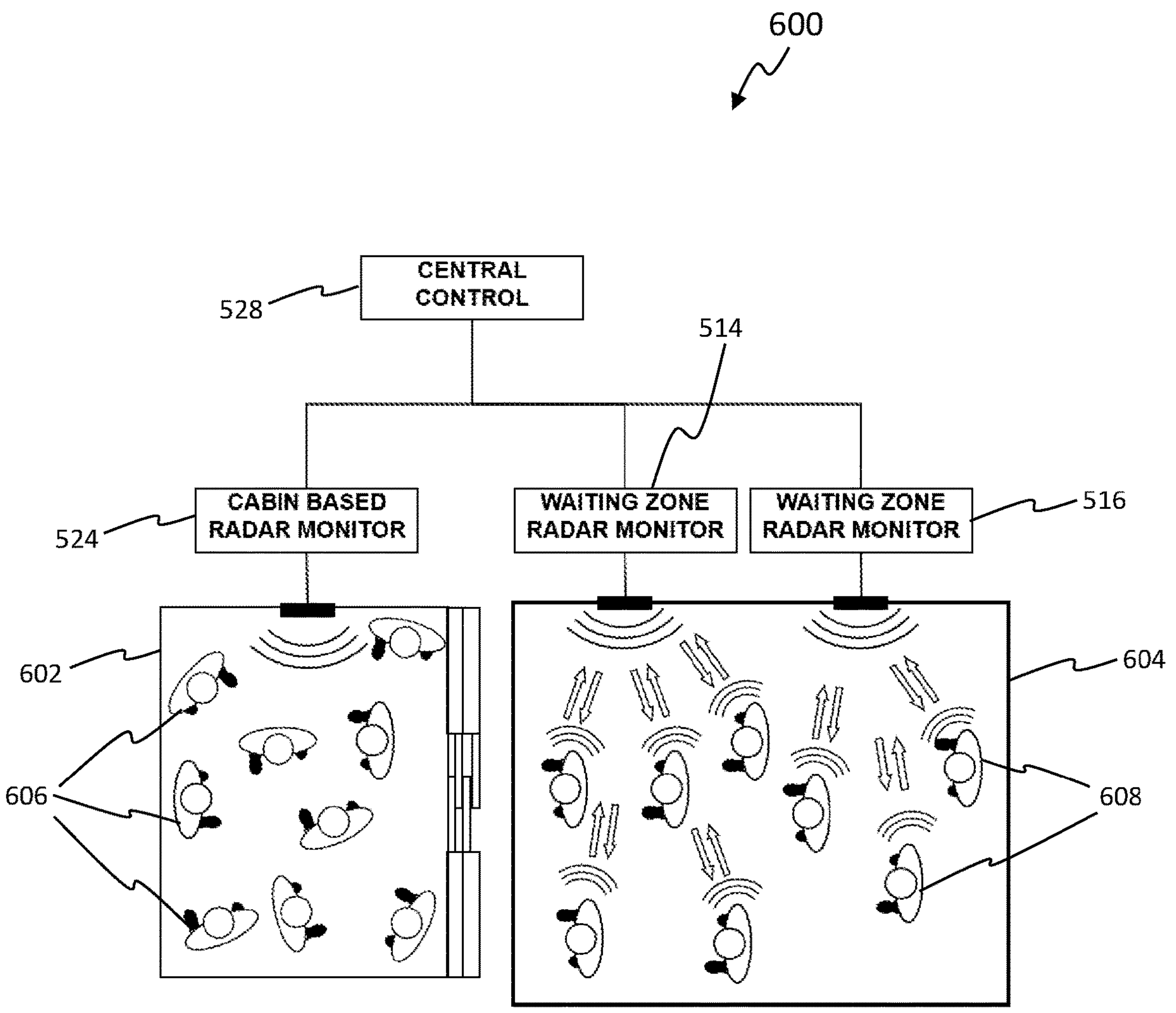
FIG. 3A is a schematic representation of radar based monitors a region within an elevator cabin and a waiting zone.

Reference is now made to FIG. 3A which schematically represents how radar-based monitors may be used to monitor passenger density within an elevator cabin 602 and within the waiting zone 604.

It is particularly noted that the monitors may be placed in the ceiling or mounted upon a wall or other situated such that passengers do not obscure each other. Where required, for example where the cabin 602 or the waiting zone 604 are large, multiple radar monitored may be used to monitor a common target zone.

Where appropriate radar systems may use radio waves which are selected with a frequency and intensity such that they may pass through obscuring bodies. It is further noted that characteristics of the radio waves may be selected for other required features, for example circularly polarized waves may be used to distinguish between direct and reflected images.

It is further noted that by monitoring the same zone over a period of time, a series of frames may be collected and stored in a memory such that the position and speed of movement of the monitored subjects may be determined. This may be useful for example in the calculation of the timing of closing of the automatic cabin 602 doors to ensure that sufficient time is provided for passengers 606 exiting or entering without causing them injury.

Similarly, the cabin 602 may be prevented from moving if the passenger 606 density is above a required threshold for example where social distancing restrictions limit the proximity permitted between individuals.

Similar restrictions may be imposed to the people 608 in gathered in the waiting zone 604, for example, guests gathered in a party hall. An alert in form of audio/visual alarm may be generated in case the people 608 density is above a required threshold for example where social distancing restrictions limit the proximity permitted between individuals.

Accordingly, the central controller 528 may be configured and operable to receive data from at least one cabin-based radar monitor 524 and at least one waiting zone radar monitor 514, 516. The central controller 528 may be further operable to analyze the data received from the at least one cabin-based radar monitor 524 and the at least one waiting zone radar monitors 514, 516. Accordingly, a processor of the central controller 528 may be operable to execute an elevator control function and thereby to generate control signals which may be communicated via a data communication lines to control the operation of the elevator system 500.

Figure 3B:
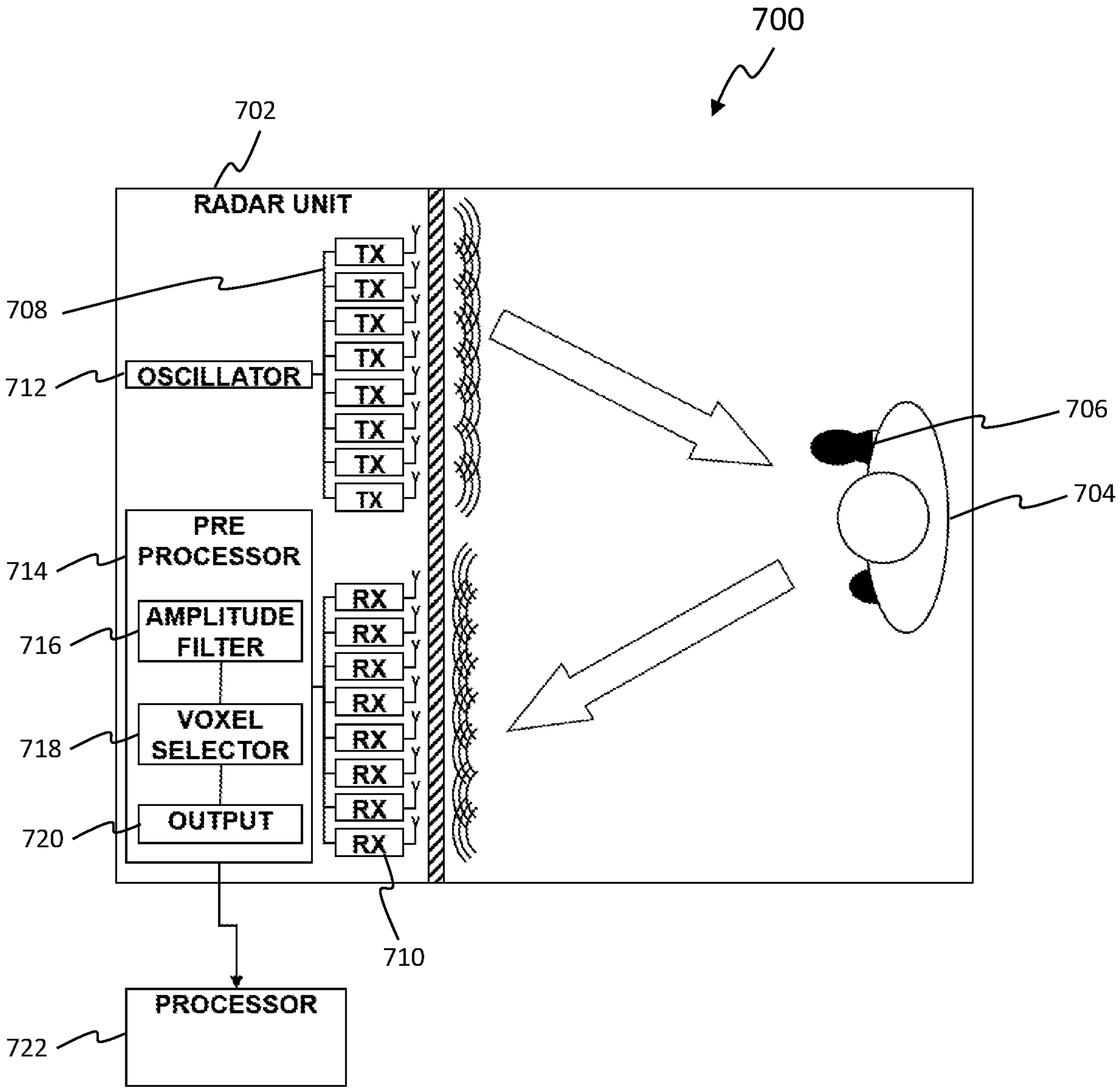
FIG. 3B is a schematic representation of a radar based monitor unit.

With reference now to FIG. 3B, a schematic representation is presented of an example of the radar-based monitor unit 700 which may be used with the passenger monitor system 500.

The typical radar system 702 which may be used in the passenger monitor system 500 may be mounted to a wall for example, or the like where it may scan a target region in front of the wall. The radar 702 typically includes at least one array of radio frequency transmitter antennas 708 and at least one array of radio frequency receiver antennas 710. The radio frequency transmitter antennas 708 are connected to an oscillator 712 (radio frequency signal source) and are configured and operable to transmit electromagnetic waves towards the target region 704. The radio frequency receiver antennas 710 are configured to receive electromagnetic waves reflected back from objects 706 within the target region 704.

Accordingly, the transmitter 708 may be configured to produce a beam of electromagnetic radiation, such as microwave radiation or the like, directed towards a monitored region 704 such as an enclosed room or the like. The receiver 710 may include at least one receiving antenna or array of receiver antennas configured and operable to receive electromagnetic waves reflected by objects 706 within the monitored region 704.

The raw data generated by the receivers is typically a set of magnitude and phase measurements corresponding to the waves scattered back from the objects 706 in front of the array. Spatial reconstruction processing may be applied to the measurements to reconstruct the amplitude (scattering strength) at the three-dimensional coordinates of interest within the target region 704. Thus, each three-dimensional section of the volume within the target region 704 may represented by a voxel defined by four values corresponding to an x-coordinate, a y-coordinate, a z-coordinate, and an amplitude value.

Typically, the receivers 710 are connected to a pre-processing unit 714 configured and operable to process the amplitude matrix of raw data generated by the receivers 710 and produce a filtered point cloud suitable for model optimization.

Accordingly, where appropriate, the pre-processing unit 714 may include an amplitude filter 716 operable to select voxels having amplitude above a required threshold and a voxel selector 718 operable to reduce the number of voxels in the filtered data, for example by sampling the data or clustering neighboring voxels.

Figure 4A:
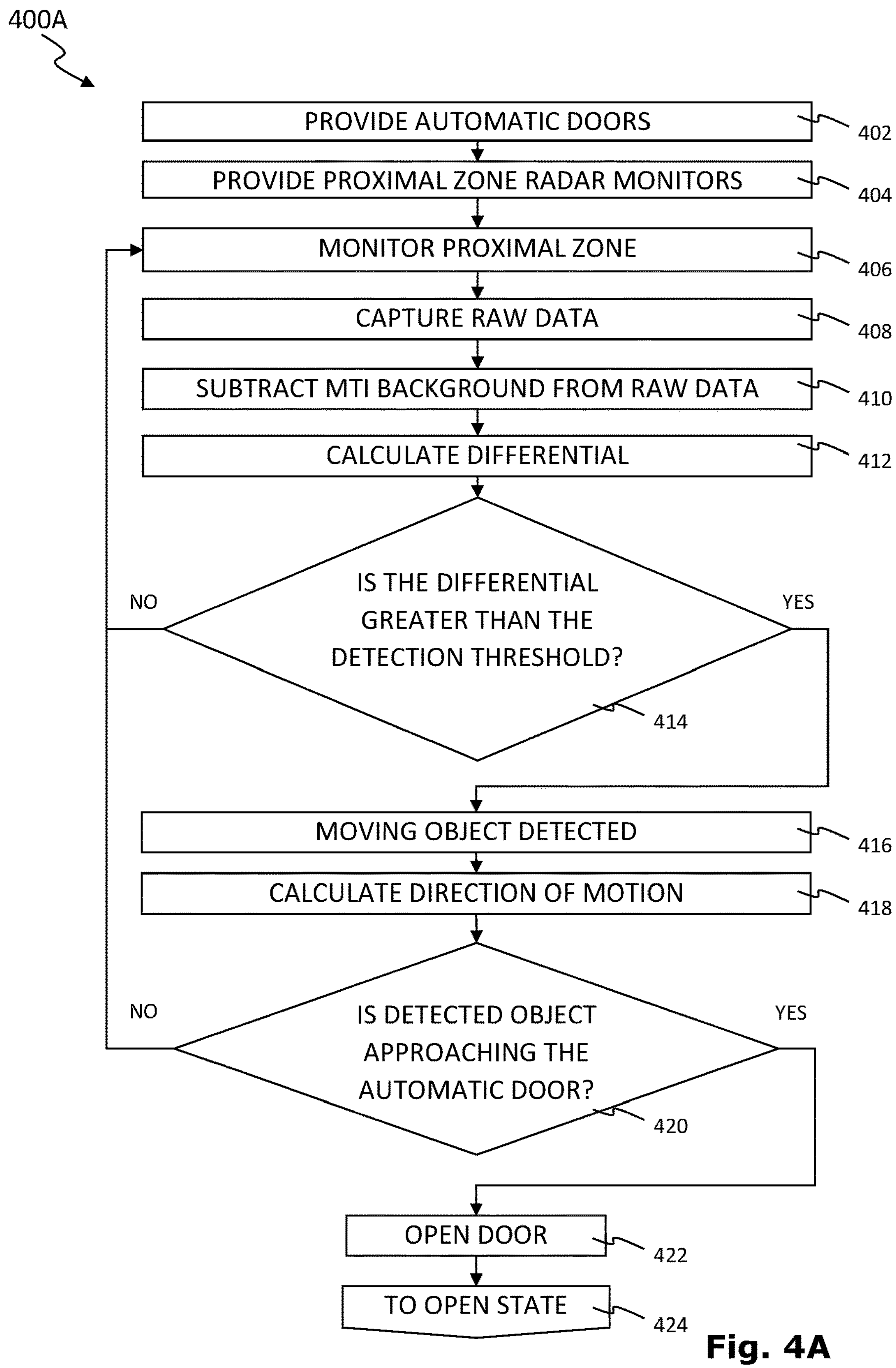
FIGS. 4A and 4B are flowcharts illustrating actions in a possible method of operation for controlling an elevator system using data generated by the radar based monitoring system.
Figure 4B:
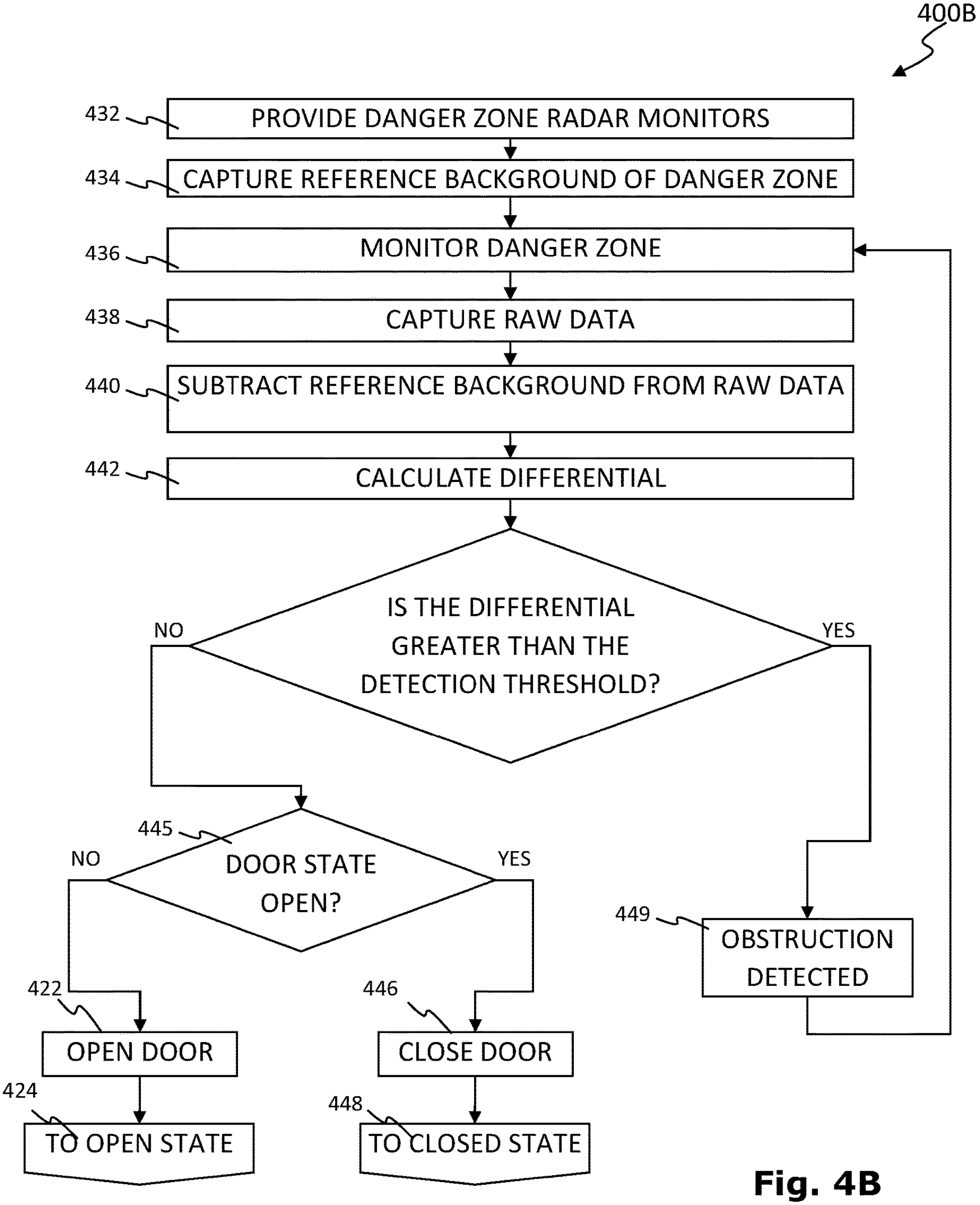

Referring now to the flowcharts of FIGS. 4A and 4B which illustrates a possible method of operation for the door monitoring system. In particular, FIG. 4A shows a possible procedure 400A for opening a monitored automatic door.

A set of automatic doors are provided 402 and a proximal zone radar monitor is provided 404 to monitor the area around the doors.

The proximal zone is monitored 406 using the radar monitor and a raw data is captured 408 by the radar's receivers. The raw data is processed to remove background 410 from the raw data and a differential is calculated 412.

The differential may be compared to a threshold value 414. If the differential is not greater than the threshold then the system takes no action and continues to monitor the proximal zone 406.

If the differential exceeds the threshold value then a moving object is detected 416 and the direction of motion is calculated 418 by monitoring the moving objects over multiple frames.

Then, the direction of the object is detected 420 and if the direction of motion is calculated to be moving away from the automatic door no action may be taken. However, if the detected object is determined to be moving towards the door the door may be opened 422, possibly timed to match the velocity of the target, and the door state may be set to OPEN 424.

The flowchart of FIG. 4B illustrates a possible procedure for safely changing state of a monitored automatic door 400B.

A set of danger zone radar monitors are provided 432 directed towards areas where items may obstruct the door and a reference background of the danger zone is captured 434.

The danger zone is monitored 436 by the radar based monitoring system. Raw data is captured 438 and the reference background is subtracted from the raw data 440. Accordingly, a differential is calculated 442.

The differential may be compared to a threshold value 444. If the differential is greater than the threshold then an object is detected 449, no action is therefore taken and continues to monitor 436.

If the differential does not exceed the threshold value then no obstruction is detected. Accordingly, if the door state is open 445 then the door may then be closed 446, and the door state is set to CLOSED 448. Alternatively, if the door state is closed 445 then door may then be opened 422, and the door state is set to OPEN 424.

Figure 5A:
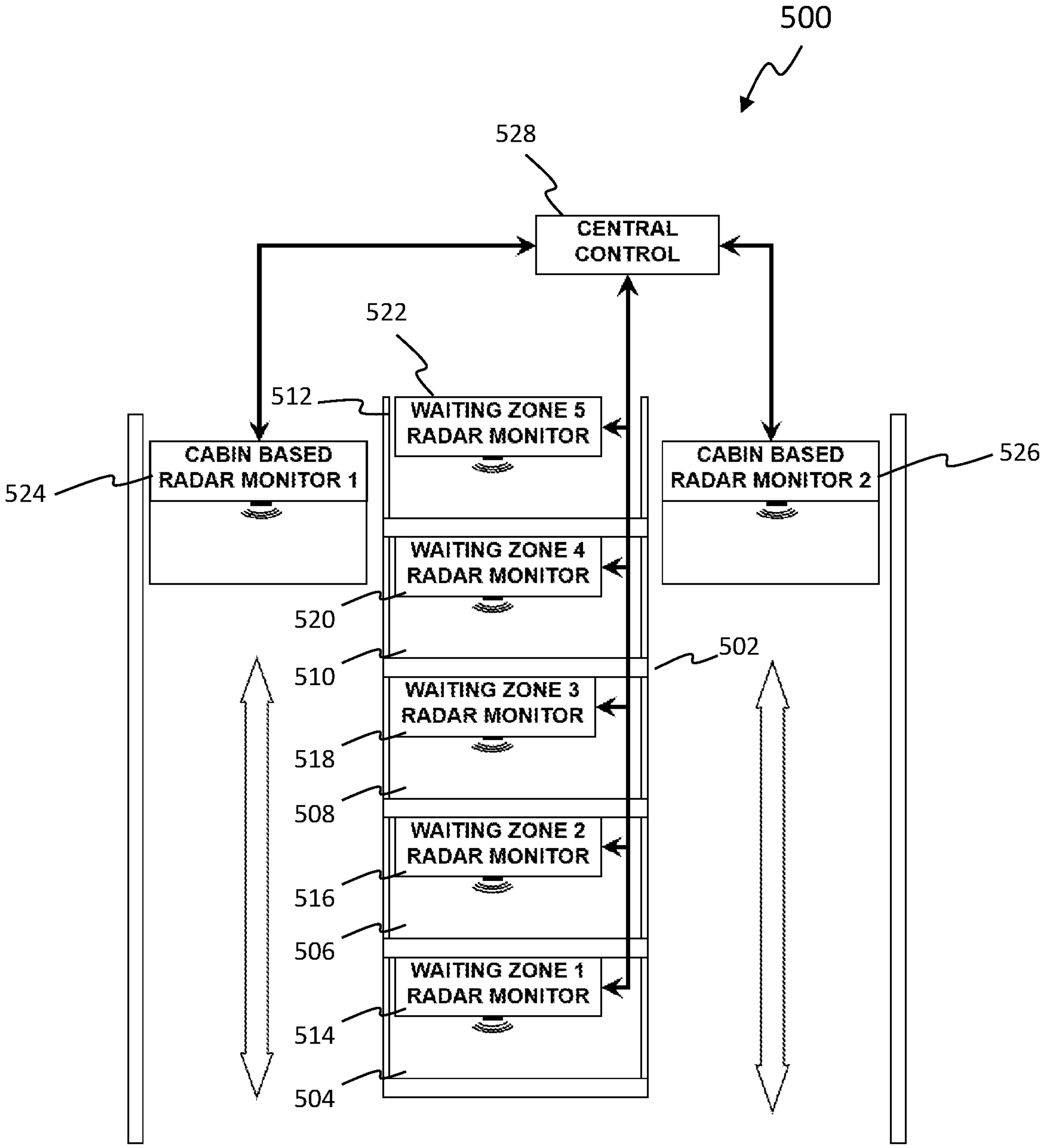
FIG. 5A is a block diagram schematically representing a possible system for monitoring the passengers using an elevator system.

Referring now to FIG. 5A which is a block diagram schematically representing an exemplary system for monitoring the passengers using an elevator monitoring system 500. The elevator monitoring system 500 includes at least one moving cabin 502 which is configured to transit between a number of stops. At each stop there is a waiting zone, waiting zone 1 504, waiting zone 2 506, waiting zone 3 508, waiting zone 4 510 and waiting zone 5 512. At which passengers generally gather to wait for an available elevator cabin which will carry them to another stop.

The monitoring system 500 of the disclosure includes at least one waiting zone radar monitor. The monitoring system 500 shows five waiting zone radar monitors, waiting zone 1 radar monitor 514, waiting zone 2 radar monitor 516, waiting zone 3 radar monitor 518, waiting zone 4 radar monitor 520 and waiting zone 5 radar monitor 522.

The monitoring system 500 of the disclosure also includes at least one cabin-based radar monitor. A cabin-based radar monitor 1 524 and a cabin-based radar monitor 2 526 are shown in the monitoring system 500. A central controller 528 is also included in the monitoring system 500.

The cabin-based radar monitors 524 and 526 are configured and operable to monitor passengers within the at least one elevator cabin 502. The waiting zone radar monitors 514, 516, 518, 520 and 522 are configured and operable to monitor passengers in the waiting zones at the elevator stops 504, 506, 508 510 and 512.

The central controller 528 is in communication with the cabin-based radar monitors 524 and 526 and the waiting zone radar monitors 514, 516, 518, 520 and 522 via data lines. The data lines may be wired communication lines such as telephone lines, Ethernet cables or the like. Additionally or alternatively, The wired or wireless communication networks may serve to connect communication units associated with the monitors and the central control as a network such as a Bluetooth network, a Wired LAN, a Wireless LAN, a WiFi Network, a Zigbee Network, a Z-Wave Network, an Ethernet Network or the like as well as combinations thereof.

Accordingly, the central controller 528 may be configured and operable to receive data from the at least one cabin-based radar monitors 524 and 526 and the at least one waiting zone radar monitors 514, 516, 518, 520 and 522. The central controller 528 may be further operable to analyze the data received from the at least one cabin-based radar monitors 524 and 526 and the at least one waiting zone radar monitors 514, 516, 518, 520 and 522. Accordingly, a processor of the central controller 528 may be operable to execute an elevator control function and thereby to generate control signals which may be communicated via a data communication lines to control the operation of the elevator system 500.

Figure 5B:
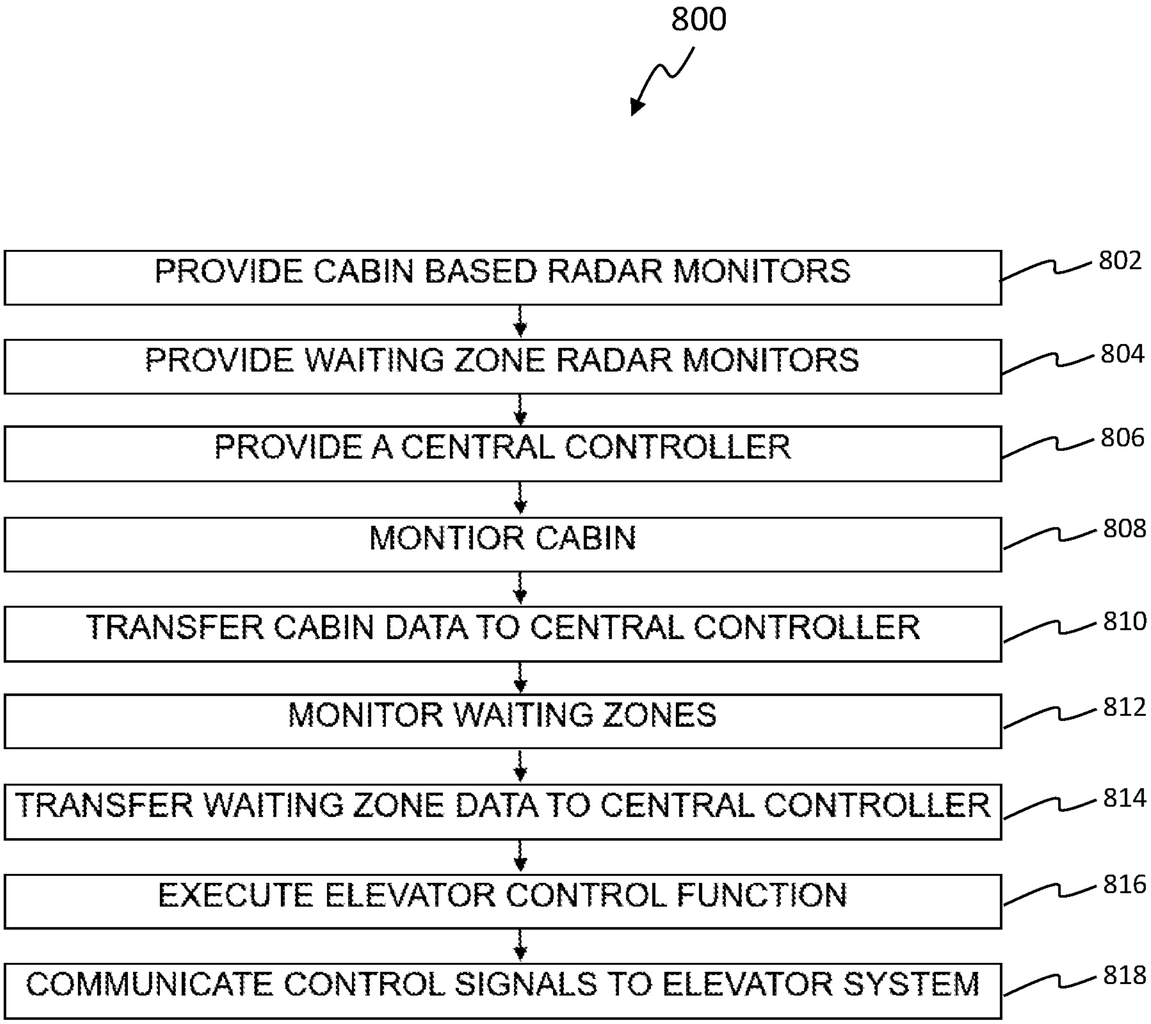
FIG. 5B is a flowchart illustrating actions in a method for controlling an elevator system using data generated by the radar-based monitoring system.

Referring now to the flowchart of FIG. 5B, exemplary actions are indicated of a method for controlling an elevator system using data generated by the radar-based passenger monitor system 500.

The method may include providing a monitoring system 500 by installing or otherwise providing cabin-based radar monitors, for example, the cabin-based radar monitor 524 within the elevator cabin 602 at step 802 and installing waiting zone radar monitors 514 and 516 in the waiting zone 604 at the stops of the elevator system at step 804. The method further provides a central controller 528 in communication with the monitors 514, 516 and 524, at step 806.

Accordingly, at step 808, the cabin-based monitor 524 may monitor passenger distribution within the cabin which may be communicated to the central controller 528 at step 810 for providing a passenger cabin distribution metric.

Similarly, the waiting zone monitors 514 and 516 may monitor passenger distribution at each of the elevator stops at step 812 which may be communicated to the central controller 528 at step 814 for providing a passenger waiting distribution metric for each stop.

At step 816, the central controller 528 may use the cabin distribution metric and the passenger waiting distribution metrics received from the monitors 514, 516 and 524 as arguments in the execution of an elevator control function.

At step 808, the elevator control function may thereby select control signals to instruct the elevator to operate as required. For example, controlling the stop schedule of the elevator or controlling the operation of the cabin and stop doors.

For example, the elevator control function may be operable to prevent movement of the elevator cabin if the received data indicates that cabin passenger density is above a threshold value. Additionally or alternatively, the elevator control function may be operable to prevent the elevator doors closing if the received data indicates that cabin 606 passenger density is above a threshold value.

Where appropriate, the elevator control function may be operable to prevent the elevator doors closing if the received data indicates that a passenger is approaching the cabin.

In other examples the monitoring system 500 may further include a security scanner configured to generate security passes for passengers. Such a system may be able to prevent tailgating in which an unauthorized individual may gain access to a restricted area by waiting for an authorized individual to open an accessway and then to enter alongside the authorized individual.

Accordingly, the elevator control function may be operable to prevent the elevator doors closing if the received data indicates that there are more passengers within the cabin than the number of security passes provided. In this way tailgating individuals may be prevented from using the elevator. Alternatively, an alert may be provided to security guards such that the unauthorized intruder may be apprehended at the next stop of the elevator. The alert may be provided in audio/visual form.

In some examples, in addition to the passenger density monitor, a health monitor may be provided which is configured and operable to measure at least one health parameter of each passenger within a target zone. Various examples of heart rate monitors and breathing monitors may be used in the system such as described in the applicants copending International patent applications serial numbers PCT/IB2021/051380 and PCT/IB2020/061959 which are incorporated herein by reference in their entirety. Such monitors may be operable to analyze a set of magnitude and phase measurements corresponding to the waves scattered back from the objects in front of a radar sensor to determine vital signs of the subjects such as heart rate and breathing rate.

It is noted that this data may be combined with parameters recorded by other monitors such as temperature sensors and weight monitors. For example, remote temperature sensors may be directed towards the passenger entering the cabin and the weight of the elevator may be monitored as each passenger enters or exits so as to determine the weight of each passenger. Accordingly, it is noted that multiple health parameters may be recorded for each passenger travelling within the elevator cabin.

In various embodiments of the automatic door monitoring system a radar is placed in front and looking perpendicular on the parting line of two doors in such a way that it gets reflections from the parting line area when the doors are closed and does not get reflection when they are open.

In other embodiments of the invention the time (TOF) it takes for the signal to travel from the radar and back is measured. This time is converted to target's distance by multiplying it by the speed of light and dividing by two. This signal is a summation of the reflections from all objects, walls, door, etc, The summation of all signals with TOF larger than room dimension is calculated. This value is called LDI, Long Distance Integral. Comparing the LDI to a threshold is a measure of the door status. If the door is closed there will be multiple reflections, as depicted in FIG. 6C and FIG. 6G and the LDI will be high. If the door is open there will be fewer multiple reflections and the LDI will be low.

In preferred embodiments the LDI threshold is automatically calculated by analyzing the LDI value when the door opens and closes.

Figure 6A:
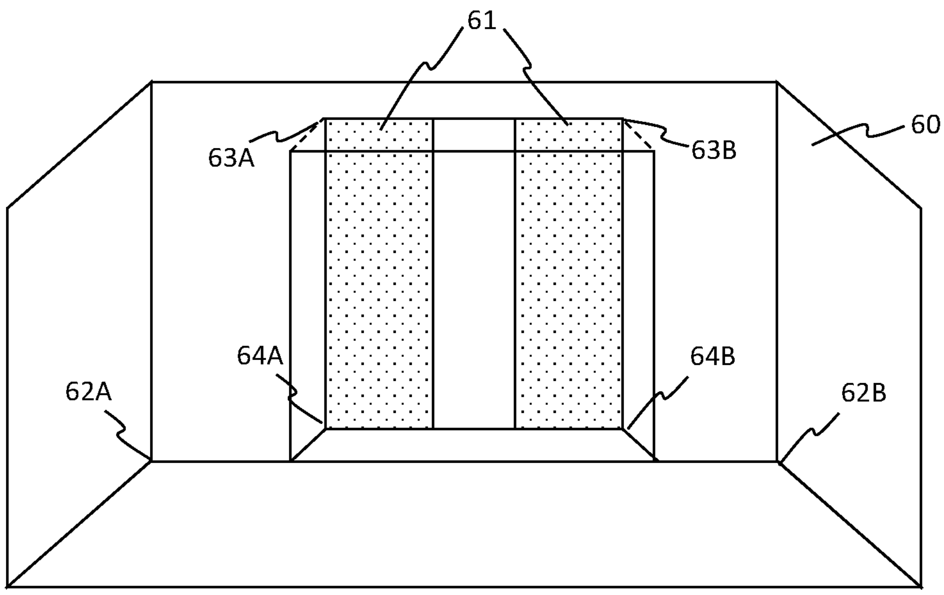
FIG. 6A depicts a perspective view of a cabin with a door half-way open.

FIG. 6A depicts a perspective view of a cabin 60, such as an elevator. It shows the fixed corners at the bottom of the cabin 62A, 62B. The cabin includes a movable door 61 which is shown partially open and which forms two upper corners 63A, 63B and two lower corners 64A, 64B between the doorway plates and the doorframe.

Figure 6B:
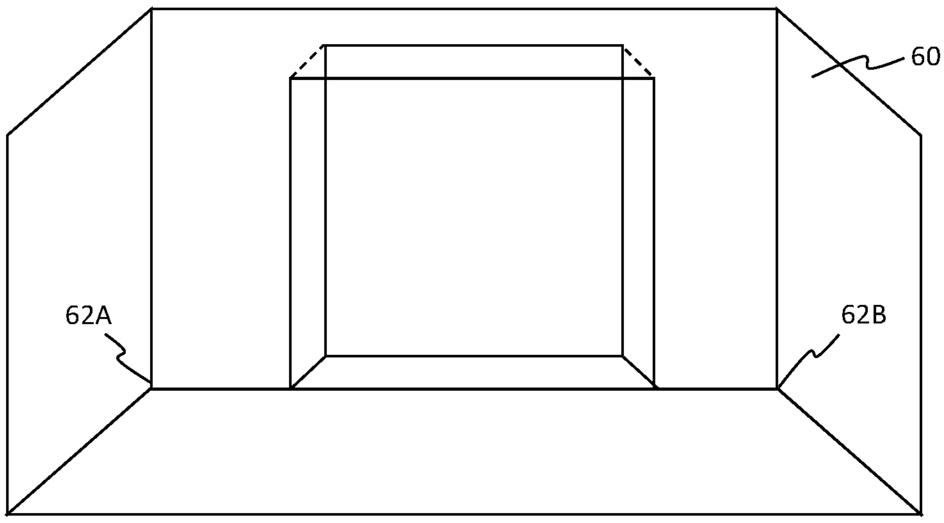
FIG. 6B depicts the same cabin when the door is fully open.
Figure 6C:
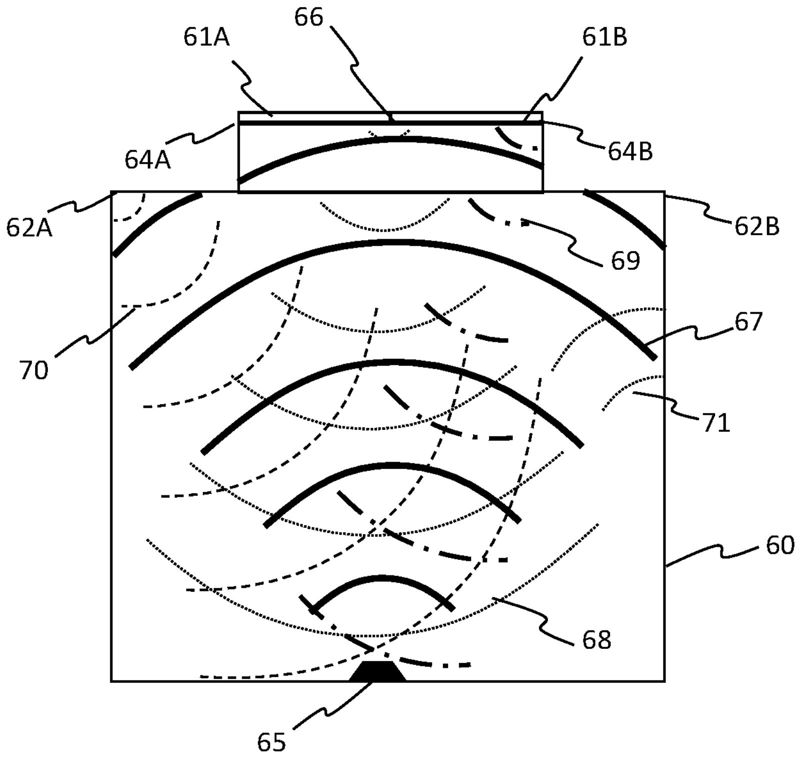
FIG. 6C depicts a top-view of a cabin with the door fully closed.

FIG. 6B depicts the same cabin 60 when the door is fully open. It is noted that with the doorway plates (not shown in FIG. 6B) fully withdrawn only the fixed corners 62A, 62B exist;

FIG. 6C depicts a top-view of a cabin 60. It shows the fixed corners 62A, 62B, the door 61 and the lower corners 64A, 64B between the doorway plates 61A, 61B and the frame. A radar sensor 65 is located across from the door 61. Outbound Radio frequency waves 67 are transmitted from the radar sensor 65 in all directions. Inbound waves 68 are reflected back from the point on the door 66 directly opposite the radar 65. It is noted that inbound waves 68 drectly from the midpoint of the door 66 may be indicative of a CLOSED door state. Other inbound waves 69 are reflected back to the radar 65 from the door corners 64B that is also received by the radar. Still other inbound waves 70 are reflected back to the radar 65 from the fixed corners 62A. Although only a selection of reflected waves are illustrated in the figure for clarity, it is noted that other incoming reflected wave are received by the radar from other reflecting points. Notably, other reflected waves do not reach the radar 65 at all.

Figure 6D:
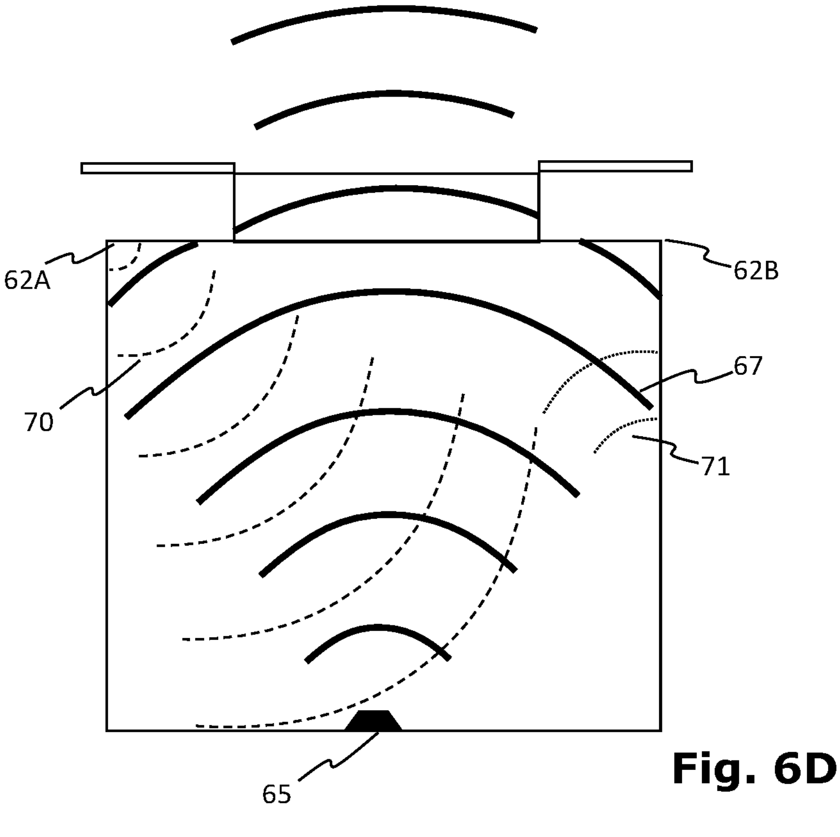
FIG. 6D depicts a top-view of a cabin when the door is fully open.

FIG. 6D depicts a top-view of a cabin 60 when the door 61 is fully open. It shows that in this case there are no reflection from the door. The reflections 71 from other points in the room and incoming reflections 70 from the fixed corners 62A remain.

Figure 6E:
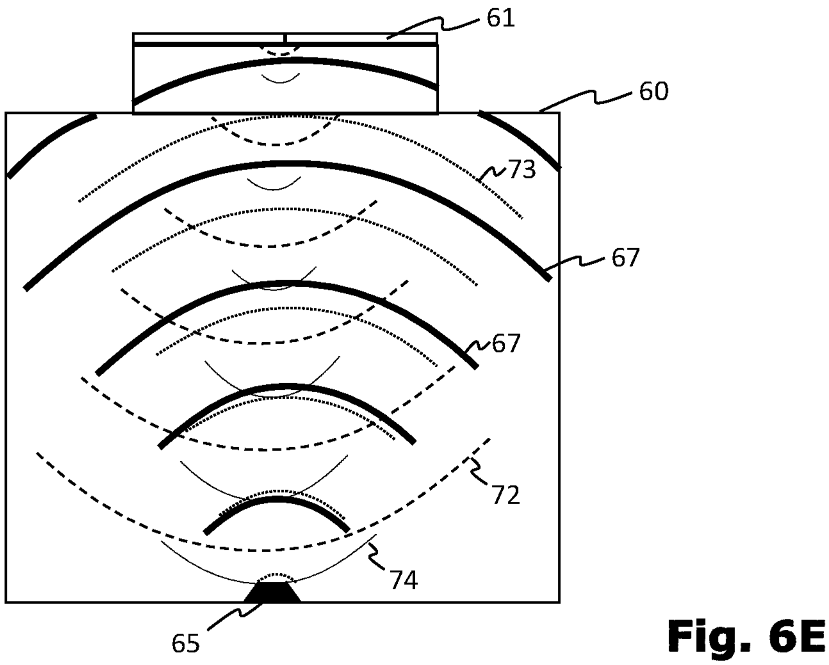
FIG. 6E depicts a top-view of a cabin with the radar sensor located at the center.

FIG. 6E depicts a top-view of another cabin 60 and a radar 65 located across from the door 61. It shows the transmitted signal 67, first reflection 72 from the door, a second reflection 73 from the back wall, and third reflection 74 from the door 61 back to the radar 65. The distance that the waves travel from the radar all the way back to the radar is four times the cabin length. Normal reflections from the walls, corners, as depicted in previous figures travel shorter distances.

Figure 6F:
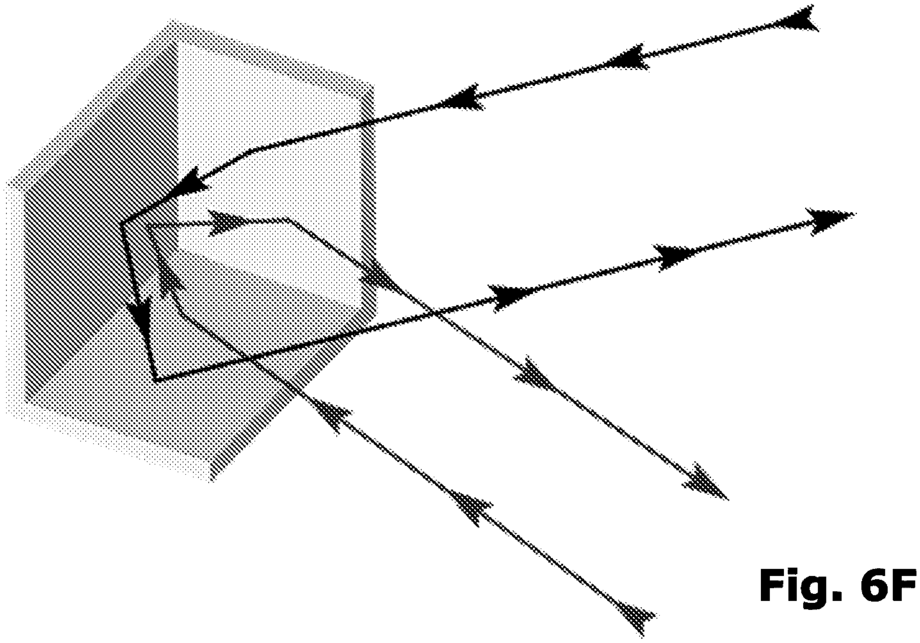
FIG. 6F depicts a corner reflector.
Figure 6G:
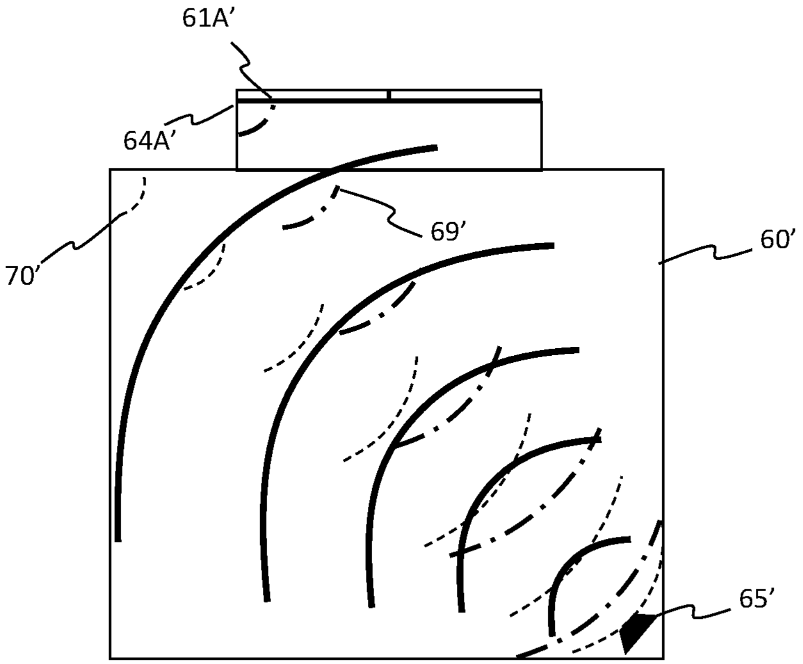
FIG. 6G depicts a top-view of a cabin and a radar sensor located in the corner.

FIG. 6F depicts a corner reflector that reflects waves coming from any direction straight back to that direction resulting from three specular reflection from the three reflective walls making the corner.

FIG. 6G depicts a top-view of an alternative cabin 60' and a radar sensor 65' located in a different position in the cabin 60'. It shows that the incoming reflection 69' from a door corner 64A' still exists and can be used to determine its status. Other incoming reflections 70 from the fixed corners 62A' also exist.

Figure 6H:
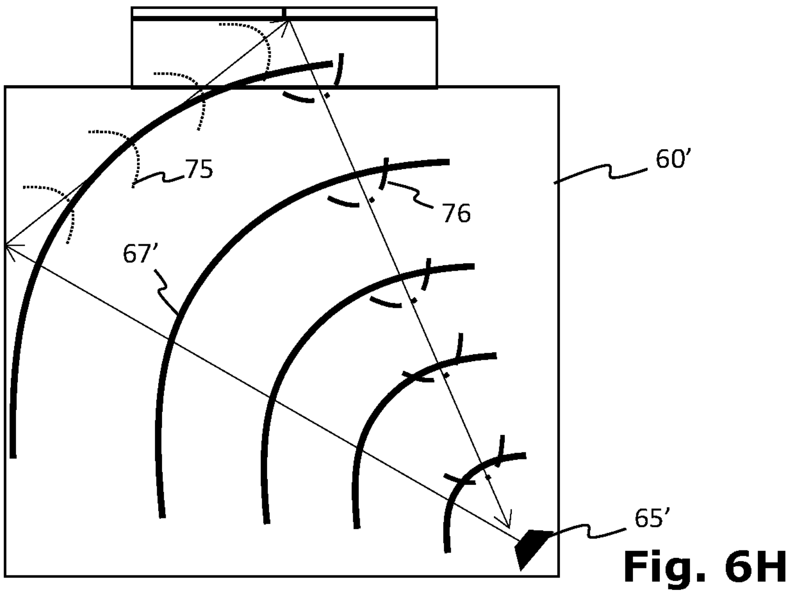
FIG. 6H depicts a top-view of a cabin with the radar sensor located at the corner showing the path of a multiply reflected signal.

FIG. 6H depicts a top-view of a cabin 60' and a radar 65' located in a corner of the cabin. It shows a transmitted signal 67', first reflection from one of the walls 75, and a second reflection 76 from the door. The distance that the waves travel from the radar back to the radar is larger than double the room length. This kind of reflections is sometimes referred to as multi-path or a multiply reflected signal.

Various methods may be used to detect the status of the door. For example, a phased-array-radar may acquire the status of a door by detecting the existence of one or more of the corners created between the door and the doorway plates.

FIG. 6A depicts these four corners, two upper corners 63A, 63B and two lower corners 64A, 64B between the doorway plates and the doorframe. FIG. 6B depicts the situation when the door is fully open and thus these four corners do not exist and do not reflect energy back to the radar 65.

Such radars may identify the flickering nature, or intermittent appearance and disappearance of door corners 63A, 63B, 64A, 64B which may be used to distinguish these from fixed corners 62A, 62B that are always present.

Such radars may be located on one of the cabin's walls without the door, somewhat below the door maximum height, so that the radar waves hit the upper corners and are reflected back to the radar.

The cabin may have more than one the door and one or more radars may be located such that there is a line of sight to the corners of both doors along which reflected waves may travel.

Additionally or alternatively, a phased-array-radar may acquire the status of a door by detecting antiphase reflections (shifted by a phase of 180 degrees) from the door to the radar. FIG. 6C depicts such a situation.

Such radars may be used to detect if the door is partially open by combining the information from the antiphase reflection and the corner reflection.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The invention claimed is:

1. A method for providing an elevator monitoring system for monitoring passengers using an elevator system, the method comprising:

providing at least one cabin-based radar monitor configured and operable to monitor passengers within at least one elevator cabin;

providing at least one waiting zone radar monitor configured and operable to monitor passengers in a waiting zone;

providing a central processor configured and operable to receive data from the at least one cabin-based radar monitor and the at least one waiting zone radar monitor, to analyze the data received from the at least one cabin-based radar monitor and the at least one waiting zone radar monitor and to execute an elevator control function to control the elevator system;

providing at least one proximal zone radar monitor configured and operable to monitor a target region around an automatic door;

providing at least one danger zone radar monitor configured and operable to monitor a danger zone where items may obstruct the door;

capturing a reference background of the danger region;

providing a door management processor configured and operable to select a door state;

the door management processor receiving raw data from the at least one proximal zone radar monitor;

the door management processor removing a background from the raw data from the proximal zone thereby calculating a proximal zone differential;

comparing the proximal zone differential to a first threshold value;

responsive to the proximal differential exceeding the first threshold value then identifying a moving object;

monitoring the moving object over multiple frames;

calculating a direction of motion associated with the moving object;

detecting current door state;

responsive to the direction of motion moving towards the door state is CLOSED, then the door management processor receives raw data from the at least one danger zone radar monitor;

subtracting the reference background from the raw data from the danger zone;

calculating a danger zone differential;

comparing the danger zone differential to a second threshold value;

if the danger zone differential exceeds the second threshold value then identifying an obstruction;

if the danger zone differential does not exceed the second threshold value then opening the door; and setting the door state to OPEN.

2. The method of claim 1 wherein the step of detecting current door state comprises:

transmitting electromagnetic waves into the at least one cabin;

receiving electromagnetic waves reflected back from sides of the at least one cabin;

processing received signals to remove multiple reflected waves;

if received signals do not include specular reflections from corners formed between the door and doorframe then selecting an OPEN state;

if received signals do not include specular reflections directly from the door then selecting a CLOSED state; and if received signals include specular reflections from corners formed between the door and doorframe then selecting a NOT OPEN state.

3. The method of claim 1 wherein executing the elevator control function comprises preventing movement of the at least one elevator cabin if the data received from the at least one cabin-based radar monitor indicates that cabin passenger density is above a threshold value.

4. The method of claim 1 wherein executing the elevator control function comprises preventing the elevator door from closing if the data received from the at least one cabin-based radar monitor indicates that cabin passenger density is above a threshold value.

5. The method of claim 1 wherein executing the elevator control function comprises preventing the elevator door closing if the data received from the at least one proximal zone radar monitor indicates that a passenger is approaching the at least one cabin.

6. The method of claim 1 further comprising providing a security scanner configured to generate security passes for passengers, and wherein executing the elevator control function comprises preventing the elevator door from closing if the data received from the at least one cabin-based radar monitor a indicates that a number of passengers within the at least one elevator cabin is more than the security passes provided.

7. The method of claim 1 further comprising providing a health monitor configured and operable to measure at least one health parameter of each passenger within the at least one elevator cabin and the waiting zone.

8. The method of claim 7 wherein providing the health monitor further comprising providing at least one array of radio frequency transmitter antennas and at least one array of radio frequency receiver antennas, wherein the at least one array of radio frequency transmitter antennas are connected to an oscillator and are configured and operable to transmit electromagnetic waves within the at least one elevator cabin and the waiting zone, and wherein the at least one array of radio frequency receiver antennas is configured to receive the electromagnetic waves reflected back from objects within the at least one elevator cabin and the waiting zone.

9. An elevator monitoring system for monitoring passengers using an elevator system, the elevator monitoring system comprising:

at least one cabin-based radar monitor configured and operable to monitor passengers within at least one elevator cabin;

at least one waiting zone radar monitor configured and operable to monitor passengers in a waiting zone;

at least one proximal zone radar monitor configured and operable to monitor a target region around an automatic door;

at least one danger zone radar monitor configured and operable to monitor a danger region where items may obstruct the door;

a central processor configured and operable to receive data from the at least one cabin-based radar monitor and the at least one waiting zone radar monitor, to analyze the data received from the at least one cabin-based radar monitor and the at least one waiting zone radar monitor and to execute an elevator control function to control the elevator system; and a door management processor configured and operable to receive data from the at least one proximal zone radar monitor and the at least one danger zone radar monitor and further operable to calculate a proximal zone differential and a danger zone differential.

10. The elevator monitoring system of claim 9 wherein the elevator control function is operable to prevent movement of the at least one elevator cabin if the data received from the at least one cabin-based radar monitor indicates that cabin passenger density is above a threshold value.

11. The elevator monitoring system of claim 9 wherein the elevator control function is operable to prevent the elevator door closing if the data received from the at least one cabin-based radar monitor indicates that cabin passenger density is above a threshold value.

12. The elevator monitoring system of claim 9 wherein the elevator control function is operable to prevent the elevator door closing if the data received from the proximal zone radar monitor indicates that a passenger is approaching the at least one cabin.

13. The elevator monitoring system of claim 9 further comprising a security scanner configured to generate security passes for passengers, and wherein the elevator control function is operable to prevent the elevator door from closing if the data received from the at least one cabin-based radar monitor indicates that a number of passengers within the at least one elevator cabin is more than the security passes provided.

14. The elevator monitoring system of claim 9 further comprising a health monitor configured and operable to measure at least one health parameter of each passenger within the at least one elevator cabin and the waiting zone.

15. The elevator monitoring system of claim 14 wherein the at least one health parameter is selected from a group consisting of heart rate, heart variability, respiratory rate, gait sleep scores, posture, temperature, weight and blood pressure of at least one passenger.

16. The elevator monitoring system of claim 14 wherein the health monitor comprises at least one array of radio frequency transmitter antennas and at least one array of radio frequency receiver antennas, wherein the at least one array of radio frequency transmitter antennas are connected to an oscillator and are configured and operable to transmit electromagnetic waves within the at least one elevator cabin and the waiting zone, and wherein the at least one array of radio frequency receiver antennas is configured to receive the electromagnetic waves reflected back from objects within the at least one elevator cabin and the waiting zone.

17. A method for safely operating an automatic door, the method comprising:

providing at least one danger zone radar monitor comprising a transmitter, a receiver and a processor;

capturing at least one reference background of at least one target region where items may obstruct the door;

receiving a request to operate a monitored door;

the transmitter of the at least one danger zone radar monitor producing a beam of electromagnetic radiation directed towards the at least one target region;

the receiver of the at least one danger zone radar monitor receiving electromagnetic radiation reflected back from the at least one target region;

the processor receiving raw data from the receiver;

subtracting one of the at least one reference background from the raw data;

calculating a danger zone differential;

comparing the danger zone differential to a threshold value;

if the danger zone differential exceeds the threshold value then identifying an obstruction; and if the danger zone differential does not exceed the threshold value then operating the automatic door.

18. The method of claim 17 wherein the step of capturing at least one reference background comprises:

capturing an OPEN-reference background when the automatic door is in an OPEN state, and capturing a CLOSED-reference background when the automatic door is in a CLOSED state.

19. The method of claim 18 wherein the step of subtracting one of the at least one reference background from the raw data comprises;

detecting a current door state, if the current door state is OPEN then subtracting the OPEN-reference background from the raw data; and if the current door state is CLOSED then subtracting the CLOSED-reference background from the raw data.

20. The method of claim 19 wherein the step of detecting the current door state comprises:

the at least one danger zone radar monitor transmitting electromagnetic waves towards the automatic door;

the at least one danger zone radar monitor receiving electromagnetic waves reflected back the automatic door;

detecting reflections from corners of the automatic door;

determining position of the corners of the automatic door;

if the position of the corners is indicative of an open door then selecting the OPEN state; and if the position of the corners is indicative of an open door then selecting the CLOSED state.

* * * * *